United States Patent
Roskind

(10) Patent No.: US 8,412,728 B1
(45) Date of Patent: Apr. 2, 2013

(54) USER INTERFACE (UI) FOR PRESENTATION OF MATCH QUALITY IN AUTO-COMPLETE SUGGESTIONS

(75) Inventor: James Roskind, Redwood City, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/245,768

(22) Filed: Sep. 26, 2011

(51) Int. Cl.
*G06F 17/30* (2006.01)

(52) U.S. Cl. .................................................. 707/767

(58) Field of Classification Search ................ None
See application file for complete search history.

(56) References Cited

U.S. PATENT DOCUMENTS

| | | | |
|---|---|---|---|
| 7,788,248 B2 * | 8/2010 | Forstall et al. | 707/706 |
| 2007/0088686 A1 * | 4/2007 | Hurst-Hiller et al. | 707/4 |
| 2009/0106224 A1 * | 4/2009 | Roulland et al. | 707/5 |
| 2009/0171929 A1 * | 7/2009 | Jing et al. | 707/5 |
| 2009/0187515 A1 * | 7/2009 | Andrew et al. | 706/12 |
| 2009/0276417 A1 * | 11/2009 | Shapira et al. | 707/5 |
| 2009/0313237 A1 * | 12/2009 | Agrawal et al. | 707/5 |

* cited by examiner

*Primary Examiner* — Bai D. Vu
(74) *Attorney, Agent, or Firm* — Sterne, Kessler, Goldstein & Fox, PLLC

(57) ABSTRACT

Methods, systems, and apparatuses, including computer programs encoded on a computer storage medium, for optimizing search engine user input selection are disclosed. In one embodiment, the method may include receiving a partial query from a user, identifying two or more query suggestions based on the partial query, and determining a probability that each respective complete query suggestion is a query that the user intended to input. The method may also include ranking the two or more query suggestions based on the probability of each respective query suggestion, and determining that a top ranking query suggestion is associated with a probability above a threshold. The method may further include providing for display the two or more query suggestions relative to the partial query, and providing for display, an indication of the top ranking query suggestion among the two or more query suggestions.

13 Claims, 8 Drawing Sheets

USER INTERFACE (UI) FOR PRESENTATION OF MATCH QUALITY IN AUTO-COMPLETE SUGGESTIONS

BACKGROUND

An Internet search engine is typically designed to search for information on the World Wide Web. Users submit search queries to the search engine and the search engine identifies and presents a list of documents in response to each search query. The list of documents may include web pages, images, sounds, and other types of files, typically identified and retrievable by their uniform resource locators (URLs). The list of documents is typically ranked according to various relevance and quality parameters before being presented to the user.

The ranked documents may be associated with related search terms. The search terms may be presented to the user of a search engine by automatically populating the search term data field with relevant search terms or combinations of search terms (e.g., "auto-completion"). The user may then read through the various search term results and may or may not select one of the terms or group of terms that would be used to perform the search. In this example, the user has to read each search term individually and may not even find a relevant search term result. As a result, attempts to use an auto-completion or auto-suggest feature often slows a user's progress with performing a query.

BRIEF SUMMARY

The embodiments described below include systems and methods for providing query suggestions to a user. According to one embodiment, a method may include receiving a partial query from a user, and identifying two or more query suggestions based on the partial query. The method may also include determining a probability that each respective complete query suggestion is a query that the user intended to input, ranking the two or more query suggestions based on the probability of each respective query suggestion, and determining that a top ranking query suggestion is associated with a probability above a threshold. The method may also include providing for display the two or more query suggestions relative to the partial query, and providing for display, an indication of the proportional ranking of the query suggestions among the two or more query suggestions.

Another example embodiment may include a method that provides receiving a partial query from a user, and identifying two or more query suggestions based on the partial query. The method may also include determining a probability that each respective query suggestion is a query that the user intended to input, ranking of the two or more query suggestions based on the probability of each respective query suggestion, and determining that neither of the two or more query suggestions is associated with a probability above a threshold. The method may also include providing for display the two or more query suggestions relative to the partial query, receiving a change to the partial query step, updating the two or more query suggestions and the ranking based on the determination that the partial query has changed, determining a top ranking query suggestion of the two or more query suggestions, wherein the top ranking query suggestion is associated with a probability above the threshold, and providing for display an indication of the top ranking query suggestion among the two or more query suggestions.

Another example embodiment may include a system that includes one or more computers, and a computer-readable medium coupled to the one or more computers having instructions stored thereon which, when executed by the one or more computers, cause the one or more computers to perform certain operations. The operations may include receiving a partial query from a user, identifying two or more query suggestions based on the partial query, determining a probability that each respective complete query suggestion is a query that the user intended to input, and ranking of the two or more query suggestions based on the probability of each respective query suggestion. The method may also include determining that a top ranking query suggestion is associated with a probability above a threshold, providing for display, the two or more query suggestions relative to the partial query, and providing for display, an indication of the proportional ranking of the query suggestions among the two or more query suggestions.

Another example embodiment may include a system that includes one or more computers, and a computer-readable medium coupled to the one or more computers having instructions stored thereon which, when executed by the one or more computers, cause the one or more computers to perform certain operations. The operations may include receiving a partial query from a user, identifying two or more query suggestions based on the partial query, determining a probability that each respective query suggestion is a query that the user intended to input, ranking of the two or more query suggestions based on the probability of each respective query suggestion, determining that neither of the two or more query suggestions is associated with a probability above a threshold, and providing for display, the two or more query suggestions relative to the partial query. Further operations may include receiving a change to the partial query, updating the two or more query suggestions and the ranking based on the determination that the partial query has changed, determining that at least one of the two or more query suggestions is associated with a probability above the threshold, and providing for display, an indication of the proportional ranking of the two or more query suggestions based on the determination that one or more of the query suggestions is above the threshold.

Another example embodiment may include a computer storage medium encoded with a computer program, the program comprising instructions that when executed by one or more processors cause the one or more processors to perform certain operations. The operations may include receiving a partial query from a user, identifying two or more query suggestions based on the partial query, determining a probability that each respective complete query suggestion is a query that the user intended to input, ranking of the two or more query suggestions based on the probability of each respective query suggestion, and determining that a top ranking query suggestion is associated with a probability above a threshold. The operations may also include providing for display, the two or more query suggestions relative to the partial query, and providing for display, an indication of the top ranking query suggestion among the two or more query suggestions.

Further embodiments, features, and advantages, as well as the structure and operation of the various embodiments are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF THE INVENTION

Embodiments are described herein with reference to illustrations for particular applications. It should be understood that the invention is not limited to the described embodiments. Those skilled in the art with access to the teachings provided herein will recognize additional modifications, applications, and embodiments within the scope thereof and additional fields in which the embodiments would be of significant utility.

Figure 1A:
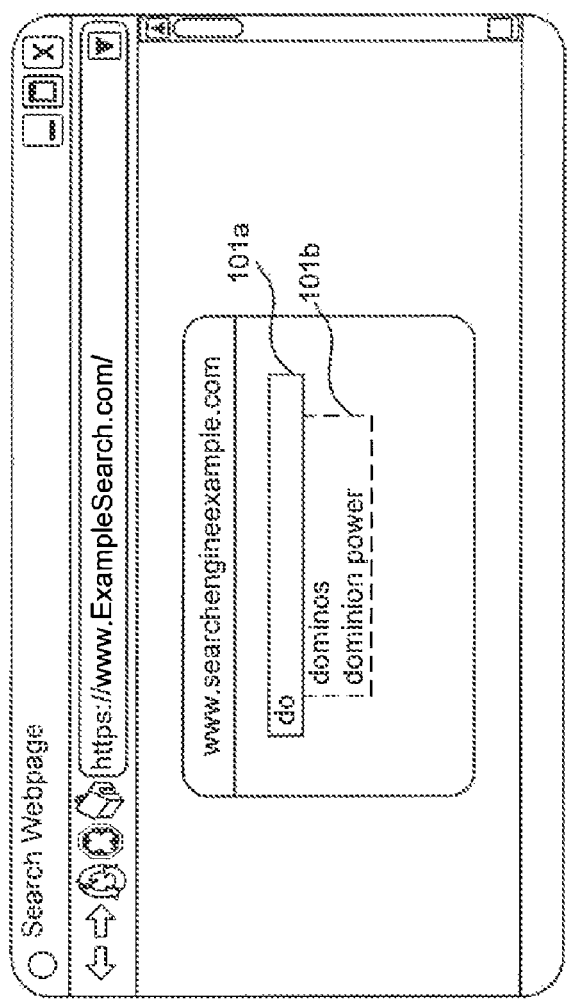
FIG. 1A is an example browser interface displaying a search engine application.

FIG. 1A is an example browser interface displaying a search engine. Referring to FIG. 1A, a search engine web page "ExampleSearch.com" may be used to perform a search. A data field 101a provides a user interface for the user to enter a search term or terms that may be used to perform a query. In this example, the user has entered the letters "do." The search engine provides auto-completion feedback, such as "dominos" and "dominion power", as displayed in drop-down list 101b. There is no limit to the number of search query suggestions provided to the user. The search query suggestions may be based on previous user search history, user demographics (e.g., location, city, user profile information, etc.), and/or predefined popularity rankings compiled from previous user queries. The search query suggestions are ranked based on these signals and the highest ranking search query suggestions can be listed at the top of the dropdown.

Figure 1B:
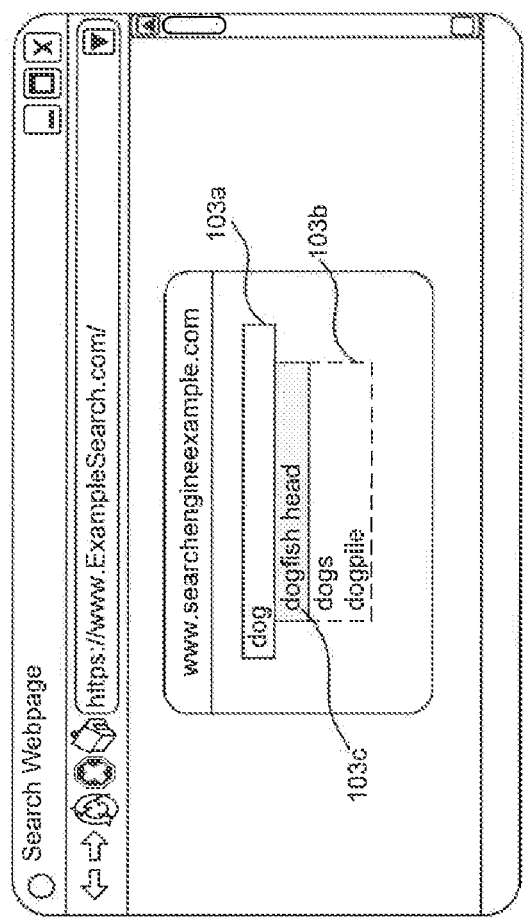
FIG. 1B is another example browser interface displaying a search engine application.

Referring to FIG. 1B, a user may input the string "dog" into data field 103a and a resulting list of relevant search query suggestions may be returned by the back end system described in detail with reference to FIG. 2. In this example, three search query suggestions are displayed in the drop-down word list 103b, "dogfish head", "dogs" and "dogpile." These search query suggestions may be based on previous user search history, user demographics (e.g., location, city, user profile information, etc.), and/or predefined popularity rankings compiled from previous user queries. However, in this example, the first suggestions "dogfish head" is illustrated as having a relevancy indicator 103c. In this example, the relevancy indicator is the suggestion highlighted in the dropdown box. The top-ranking suggestion can include a relevancy indicator to indicate to the user the most relevant search query based on the input string so far. Additional relevancy indicators may include, color highlighting indicators, flashing terms that illuminate to secure the attention of the user, bolded terms, and enlarged terms. Still further relevancy indicators may include ascending/descending list rankings of query suggestions including percentages or numbers to show the relevance, indicator terms accompanied by a relevancy chime or audible indicator to attain the user's attention that the most relevant term is present. In another example embodiment, the relevancy indicator(s) may indicate which of the query suggestions exceed a threshold of relevancy to the input search term (e.g., "dog"). Examples of further relevancy indicators are discussed in detail below with reference to FIGS. 1B and 1C.

Figure 1C:
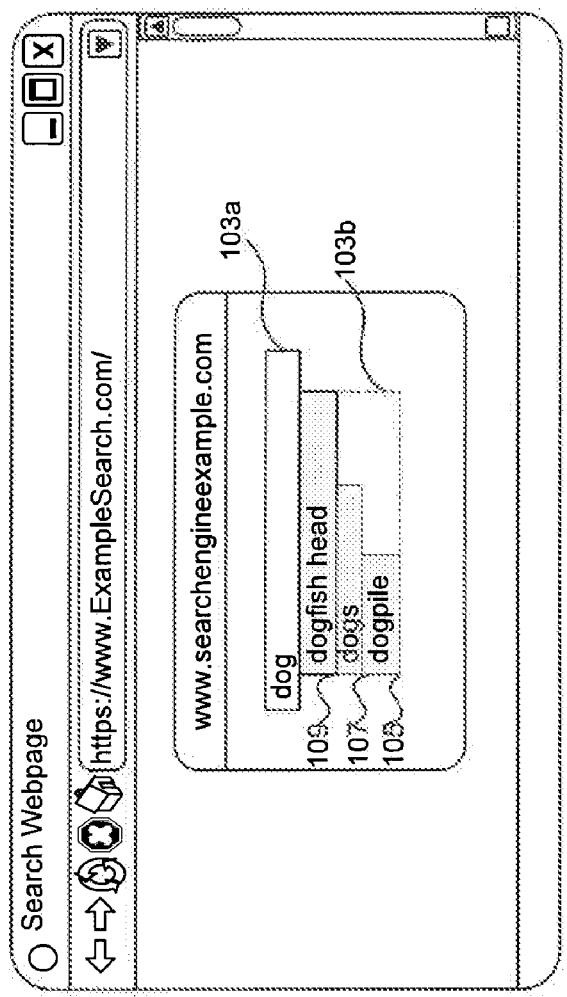
FIG. 1C is an additional example browser interface displaying a search engine application.

FIG. 1C illustrates additional example browser interfaces displaying a search engine application according to an example embodiment. Referring to FIG. 1C, the same example as FIG. 1B is illustrated. In this example, additional relevancy indicators are displayed to assist with the user's selection operation. In this example, the term "dog" has yielded additional search query suggestions which are considered relevant based on search term calculations performed by the back end system of FIG. 2. However, in addition to the search query suggestions in drop-down list 103b, a ranking relevancy indicator has been displayed with the drop-down list 103b. As shown, the query suggestions may be provided with an overlay of a histogram bar chart indicating their relevancy to the search query. In other example embodiments, the histogram may appear on other portions of the screen and may include different forms of representation (e.g., pie chart, coordinates, etc.).

The relevance magnitudes of the search query suggestions 105 "dogpile", 107 "dogs" and 109 "dogfish head" are each represented corresponding to a measure of the query suggestion's respective relevancy to the input string. In other words, the query "dogfish head" 109 may be the most relevant "dog" related search query. The difference in magnitude between "dogfish head" 109 and the next most relevant search query suggestions "dogs" 107 and "dogpile" 105 may be proportional to the relevancy of the search query suggestions calculated. For example, if the magnitude of the bar graph indicator "dogfish head" 109 is 20 percent larger than the search query "dogs" 107, then the relevancy score for those queries may be only 20 percent different. This provides the user with a simple way to view the likelihood that a particular query is more relevant than the others. A search query suggestion that produces a corresponding bar graph magnitude that is much larger in magnitude than the other search query suggestions would likely yield a positive selection by the user.

The example of FIG. 1C shows the extent to which one search query suggestion may be considered more relevant to the input (or partially input) search term entered by the user. In an example embodiment, the query suggestion(s) shown to the user may include only those query suggestion(s) that exceed a relevancy threshold to the search term(s), whereby the relevant suggestions (e.g., that exceed the threshold) may then be ranked against one another and provided as suggestions to the user.

Figure 1D:
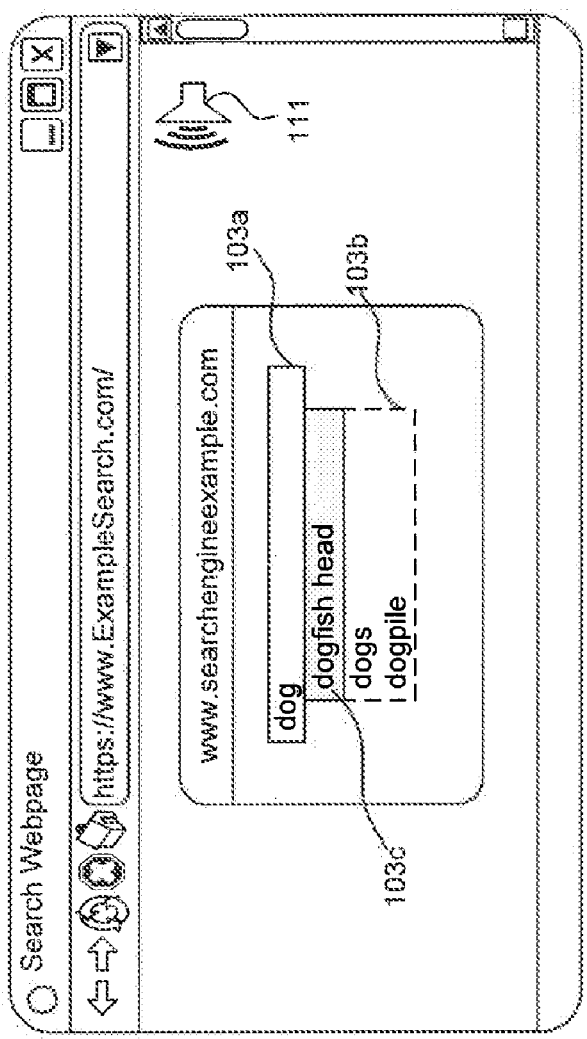
FIG. 1D is yet a further example browser interface displaying a search engine application.

FIG. 1D illustrates yet another example browser interface displaying a search engine application according to an example embodiment. Referring to FIG. 1D, the same example of FIG. 1B is illustrated in FIG. 1D, however, an additional relevancy indicator is displayed. In this example, the relevancy indicator produces an audible indicator to notify the user and assist with the user's selection of a search query suggestion displayed in response to an input string. In this example, the term "dog" has yielded additional search query suggestions which are considered relevant based on search query calculations performed by the back end system of FIG. 2. However, in addition to the search queries in drop-down list 103b, an audible indicator 111 may appear visible to the user and/or initiate an audible sound, such as a chime or beep sound to indicate that the most relevant query "dogfish head" 103c is presently displayed in the drop-drown menu list 103b.

In some embodiments, an indicator, such as an audible indicator, may appear when the expected probability that the first N entries, such as the first singular entry "dogfish head," has an expectation of correctness above some absolute threshold, such as greater than 30%. In some embodiments, an indicator may appear may appear when the ratio of the expectation of correctness of the top Nth entry, such as the first entry "dogfish head," is proportionately larger, such as twice as large, as the expectation of correctness of the N+1$^{st}$ entry, such as the second entry "dogs" in this example.

Figure 2:
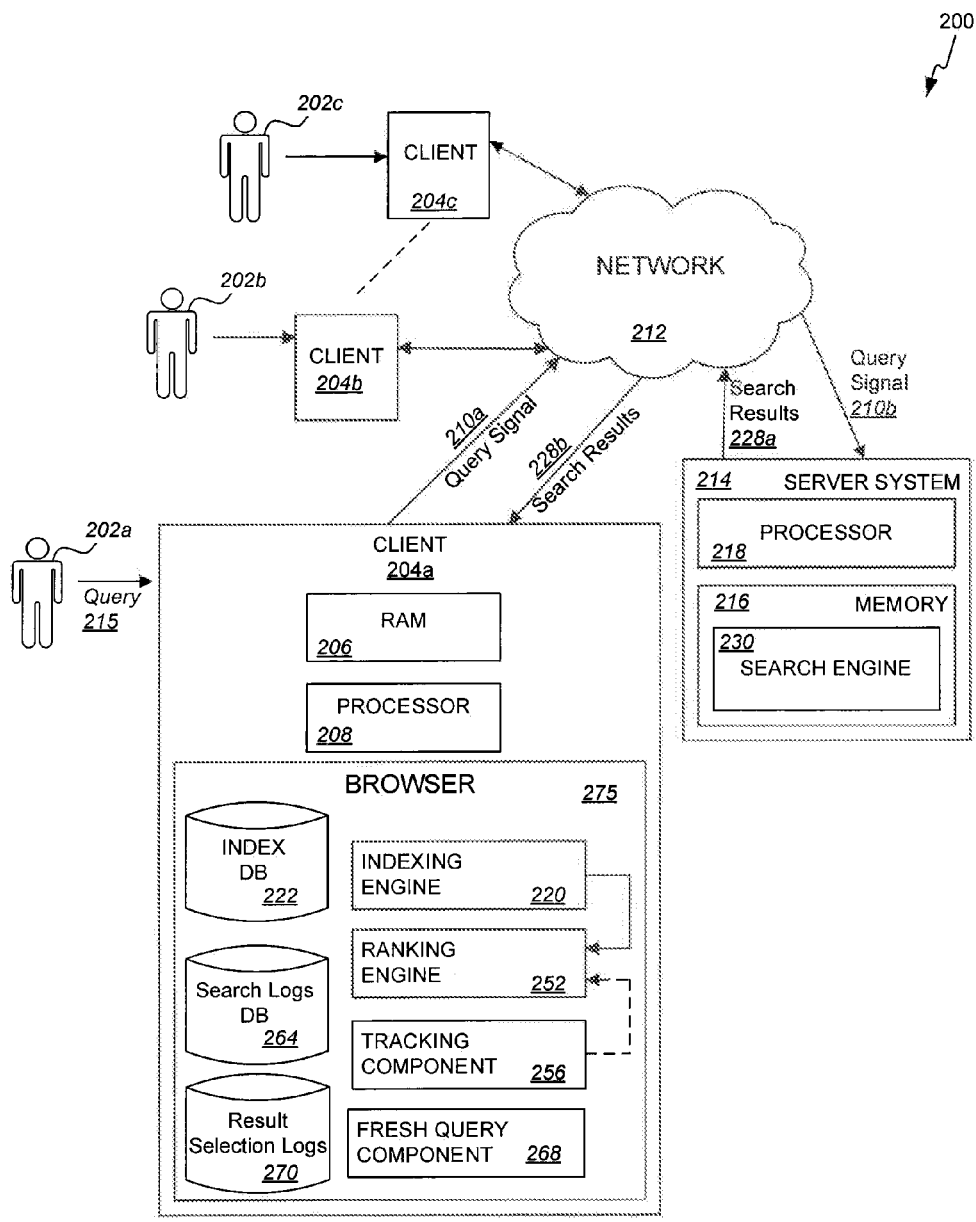
FIG. 2 is a block diagram of an example information retrieval system in which user input is processed to compile search results.

FIG. 2 is a block diagram of an example information retrieval system 200 in which search query suggestions are provided in response to search queries that can be implemented in the Internet, an intranet, or other client/server environment. Illustrated components and "engines" in FIG. 2 represent functionality that is implemented by one or more computer programs. Although several components are illustrated, there may be fewer or more components in the system 200. Moreover, the components can be distributed on one or more computing devices connected by one or more networks or other suitable communication media.

A user 202 (202a, 202b, 202c) can interact with the system 200 through a client device 204 (204a, 204b, 204c) or other device. For example, the client device 204 can be a computer terminal or hand held device within a local area network (LAN) or wide area network (WAN). The client device 204 can include a random access memory (RAM) 206 (or other memory and/or a storage device) and a processor 208. The processor 208 is structured to process instructions within the system 200. In some implementations, the processor 208 is a single-threaded processor. In other implementations, the processor 208 is a multi-threaded processor. The processor 208 can include multiple processing cores and is structured to process instructions stored in the RAM 206 (or other memory and/or a storage device included with the client device 204) to display graphical information for a user interface.

A user 202a can connect to a search engine 230 within a server system 214 to submit a query 215. When the user 202a submits the query 215 through an input device attached to a client device 204a (e.g., a keyboard, a mouse, a microphone, a camera, a motion sensor, and so on), a client-side query signal 210a is sent into a network 212 and is forwarded to the server system 214 as a server-side query signal 210b.

Server system 214 can be one or more server devices in one or more locations. A server device 214 includes a memory device 216, which can include the search engine 230 loaded therein. A processor 218 is configured to process instructions within the device 214. These instructions implement one or more components of the search engine 230. The processor 218 can be a single-threaded processor or a multi-threaded processor, and can include multiple processing cores, for instance. The processor 218 processes instructions stored in the memory 216 related to the search engine 230 and can send information to a client device 204a-c, through the network 212, to create a presentation in a user interface of the client device (e.g., a search results web page displayed in a web browser).

The server-side query signal 210b is received by the search engine 230. The search engine 230 uses the information within, the user query 215 (e.g. query terms or search query) to find relevant documents responsive to the query 215.

User 202a may enter query 215 into a browser 275 that may communicate over network 212 with search engine 230. For example, user 202a may enter query 215 into a text box that appears on a webpage of search engine 230 as rendered in browser 275. Browser 275 may include, for example, a web browser.

The browser 275 can include an indexing engine 220 that searches a corpus (e.g., web pages on the Internet accessed using browser 275) to index the documents found in that corpus, and the index information for the documents in the corpus can be stored in an index database 222. This index database 222 can be accessed to identify documents responsive to the user query 215. Note that an electronic document (which for brevity will simply be referred to as a document) does not necessarily correspond to a file. A document can be stored in a portion of a file that holds other documents, in a single file dedicated to the document in question, or in multiple coordinated files. Moreover, a document can be stored in a memory without having first been stored in file.

The browser 275 can include a ranking engine 252 to rank the documents responsive to the user query 215 submitted by client devices 204a-c. The ranking of the documents can be performed using traditional techniques for determining an information retrieval (IR) score for indexed documents in view of a given query. The relevance of a particular document with respect to a particular query search term or to other provided information may be determined by any appropriate technique. For example, the general level of back-links to a hypertext document that contains matches for a search term may be used to infer a document's relevance. In particular, and by way of illustration, if a document is linked to (e.g., is the target of a hyperlink) by many other relevant documents (e.g., documents that also contain matches for the search terms), it can be inferred that the target document is particularly relevant. This inference can be made because the authors of the pointing documents presumably point, for the most part, to other documents that are relevant to their audience. In another example embodiment, indexing engine 220 may index words and/or phrases from the documents, and then ranking engine 252 may rank the indexed words and/or phrases.

A tracking component 256 can be used to record information regarding user behavior such as individual user selections of the results presented in a ranking (e.g., 104). For example, the user interface 100 can include embedded JavaScript code (e.g., that may be implemented in browser 275) that communicates with the tracking component 256 information regarding selections (e.g., mouse clicks) of individual document results (e.g., 104a) and also identifies when the user returns to the results page after viewing a result document, thus indicating the amount of time the user spent viewing the selected document result. According to an example embodiment, a user 202 may opt in and/or out of having his/her selections tracked using tracking component 256.

In other implementations, the tracking component 256 can be a proxy system through which user selections of the document results are routed, or the tracking component 256 can include pre-installed software at the client (e.g., a plug-in to the client's operating system). Other implementations are also possible, such as by using a feature of browser 275—which in some implementations is used to implement the user interface 100—that allows a tag/directive to be included in a page, which requests the browser to connect back to the server with message(s) regarding link(s) clicked by the user.

The recorded information can be stored in result selection logs 270. The recorded information can include log entries that indicate, for each user selection, the query (Q), the document (D), the user's dwell time (T) on the document, the language (L) employed by the user, and the country (C) where the user is likely located (e.g., based on the server and/or client used to access the information retrieval system). Other information indicative of user behavior can also be recorded, such as the click-through rate (CTR) which is the percentage of users that select a document as a search result out of the total number who have the opportunity to select the document in a search result list but do not (also called "impressions").

In various implementations, the time (T), also known as "click data", can be measured as the time frame between the initial selection of the document result until the time the user returns to the user interface 100. In the case of video search results, the "click data" can be a measure of how long a user viewed the video or whether they viewed the video in its entirety. In general, an assessment is made about the time (T) regarding whether this time indicates a longer view of the document result or a shorter view of the document result, since longer views are generally indicative of quality or relevance for the clicked through result. This assessment about the time (T) can further be made in conjunction with various weighting techniques. In some implementations, the ranking engine 252 uses information collected in the result selection logs 270 in order to enhance the ranking of results.

A fresh query component 268 provides fresh related queries in response to users' queries provided via browser 275. The fresh query component 268 will be discussed further below with reference to FIG. 3. The browser 275 may provide the final, ranked result list within the server-side search results signal 228*a* along with the fresh related queries provided by the fresh query component 268. Exiting the network 212, the client-side search results signal 228*b* can be received by the client device 204*a* where the results and fresh related queries can be stored within the RAM 206 and/or used by the processor 208 to display the results on an output device for the user 202*a*.

Search logs 264 are used to record search queries. The search engine 230 or another process maintains the search logs. For example, issued image search queries can be stored in an image search log and issued news search queries can be stored in a news search log. The search logs 264 and other information are used by the fresh query component 268 to identify fresh related queries. The search logs 264 may include for example, search words, terms and/or other phrases used by user 202 to perform one or more searches.

The components shown in FIG. 2 can be combined in various manners and implemented in various system configurations. For example, portions of the search engine 230 or the fresh query component 268 can reside in the client RAM (e.g., 206) instead of the server memory 216 or the processor 208, respectively. According to an example embodiment, there may be one or more intermediate servers through which query signals and search results flow between the clients 104*a-c* and the server 214.

In operation, a user 202 may submit a query 215 into their client device 204 based on one or more search terms selected according to the examples described above with reference to FIGS. 1A-1C. The user 202 may enter one or more letters or numbers (a partial query) in the data field 103*a*. The system may identify a plurality of search query suggestions based on the partial query input. For example, the system may determine probability that each complete search query suggestion is a query that the user intended to input, in order to increase the likelihood of relevancy. The system may also rank the search query suggestions based on the relevance of each search query suggestion. This provides a basis for prioritizing certain suggestions and displaying them with the relevancy indicators, such as those illustrated in FIGS. 1A-1C (i.e., 103*c*, 105, 107, 109, and 111). The user may be able to select an automatically generated search term or terms on-the-fly based on the top ranking query suggestion(s). The suggestions may provide the necessary feedback the user needs to make an appropriate search term selection and execute a corresponding query.

As referenced above, the system may compare the relevancy of the search queries against a threshold relevancy. In an example embodiment, the system may return only those query suggestions that meet or exceed the threshold, and/or otherwise indicate, in the returned results, which query suggestions (if any) meet or exceed the threshold. The relevancy determination may be determined by considering any number of factors including general search trends, user location, user search history, etc. The threshold may be determined on a user-by-user basis, and/or applied generally across a broad base of users (e.g., whereby a suggestion must have a threshold of 20% likelihood of relevancy to be returned). Or for example, the relevancy and/or threshold may be adjusted depending on the length of the input query by the user (e.g., whereby longer queries may result in increasing relevancy thresholds because of a more specified user search).

Figure 3:
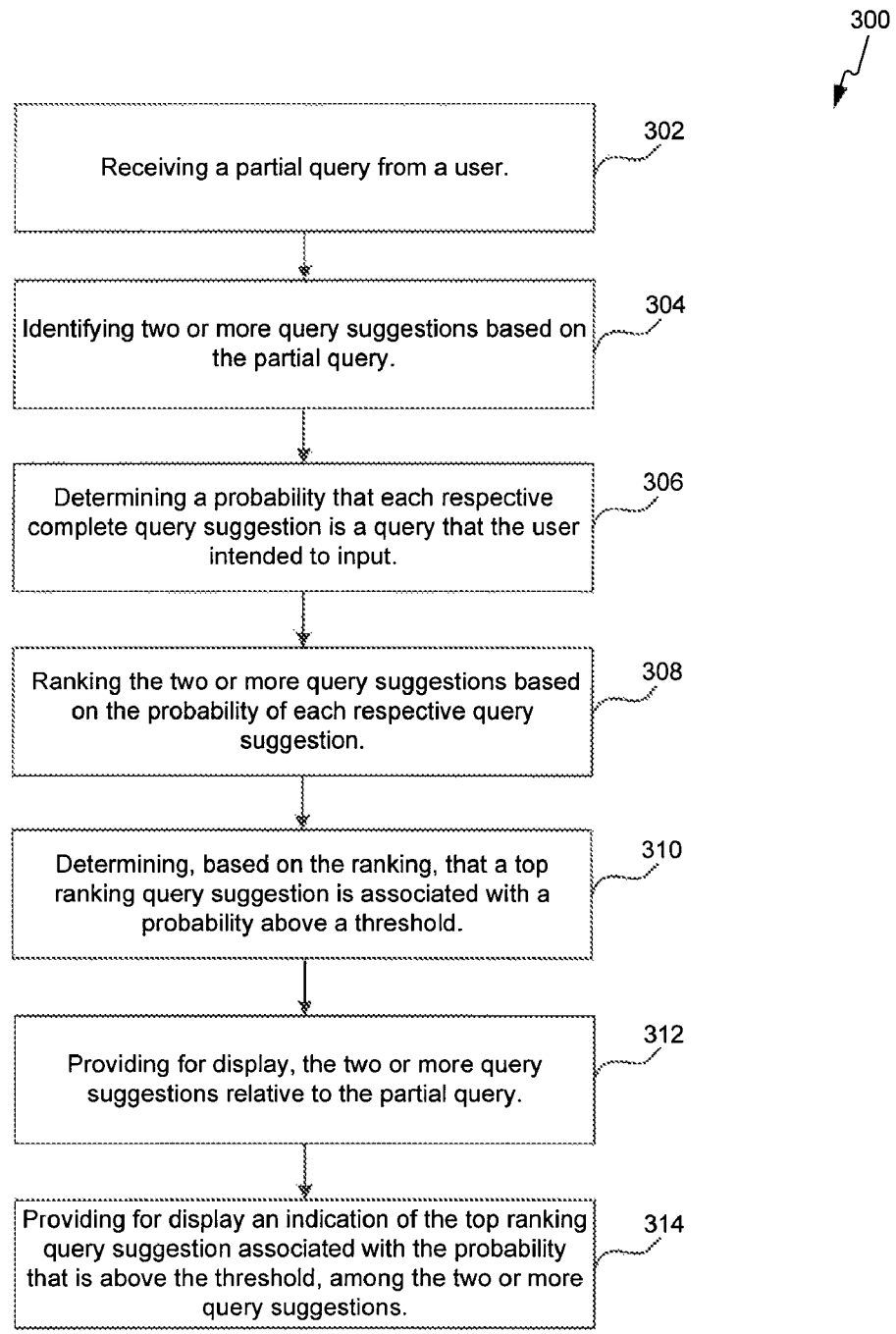
FIG. 3 is a flow chart of an example method of operation.

FIG. 3 is a flow diagram of example operations of a method according to an example embodiment. Referring to FIG. 3, a method of operation 300 is illustrated as including a set of steps 302-314. At step 302, the method may include receiving a partial query from a user. At step 304, two or more query suggestions can be identified based on the partial query. At step 306, a probability that each respective complete query suggestion is a query that the user intended to input is determined. At step 308, two or more query suggestions can be ranked based on the probability of each respective query suggestion. At step 310, based on the ranking, a determination is made that a top ranking query suggestion is associated with a probability above a threshold. At step 312, the two or more query suggestions are provided for display relative to the partial query. At step 314, an indication of the top ranking query suggestion, associated with the probability, that is above the threshold, is provided for display among the two or more query suggestions. In another example embodiment, at step 314 the indication may provide an indication that the top ranking query suggestion is above a threshold. In another example embodiment, the indication may provide an indication as to the extent by which the top ranking query is considered more relevant than other queries (e.g., as shown in the histogram of FIG. 1C).

Figure 4:
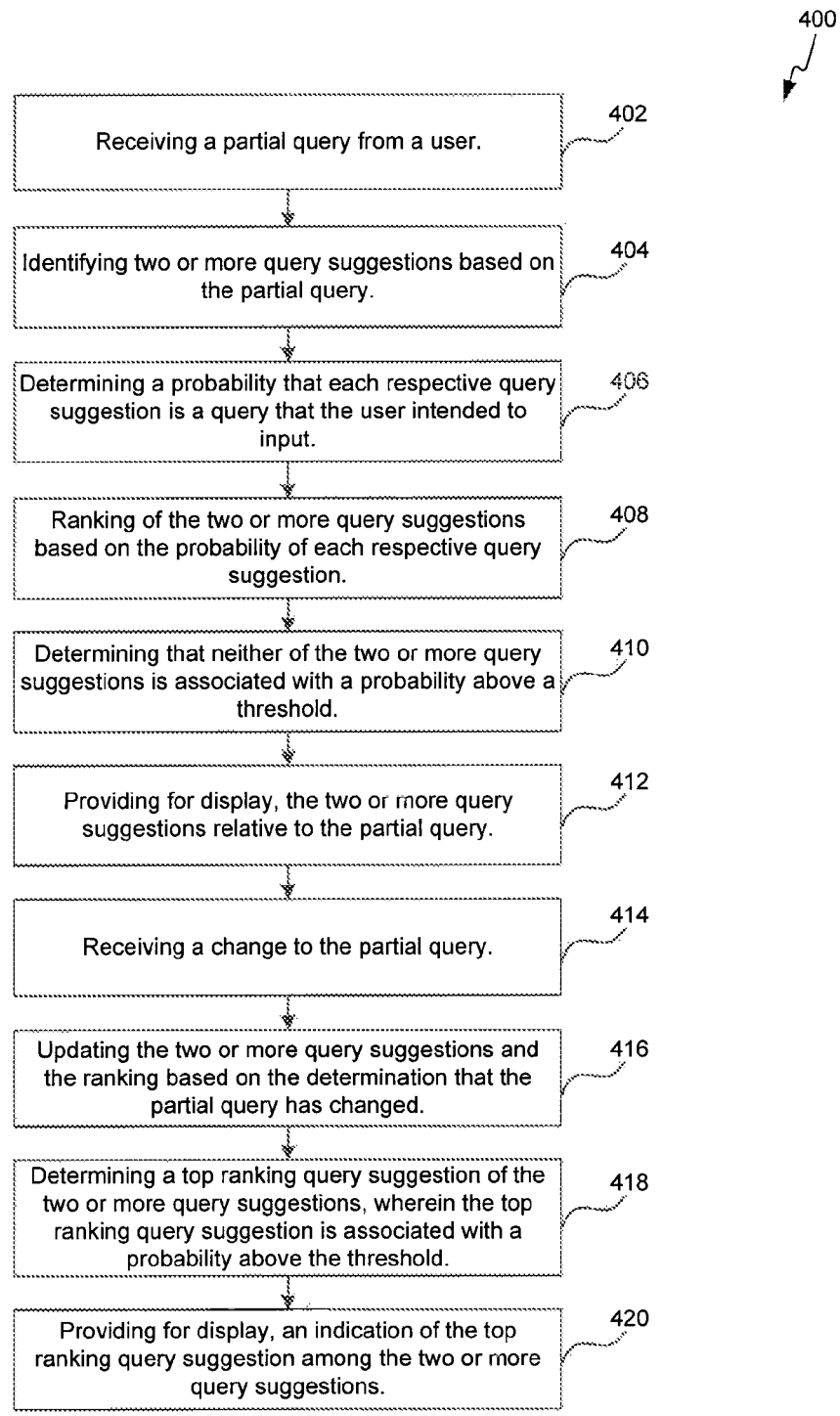
FIG. 4 is another flow chart of an example method of operation.

FIG. 4 is a flow diagram of example operations of a method according to an example embodiment. Referring to FIG. 4, a method of operation 400 is illustrated as including a set of steps 402-420. At step 402, the method may include receiving a partial query from a user. At step 404, two or more query suggestions are identified based on the partial query. At step 406, a determination is made of a probability that each respective query suggestion is a query that the user intended to input. At step 408, the two or more query suggestions are ranked based on the probability of each respective query suggestion. At step 410, a determination is made that neither of the two or more query suggestions are associated with a probability above a threshold. The threshold may be a predetermined probability (e.g., 60%, 80%, etc.) that is required to be met or exceeded by the processing system in order for the query suggestions to be considered relevant. If the query suggestions are below the threshold value, the determination may be made that the two or more query suggestions have not met the predetermined threshold. At step 412, the two or more query suggestions are provided for display relative to the partial query. At step 414, a change to the partial query is received. At step 416, the two or more query suggestions and the ranking are updated based on the determination that the partial query has changed. At step 418, a determination is made that a top ranking query suggestion of the two or more query suggestions, wherein the top ranking query suggestion is associated with a probability above the threshold. At step 420, an indication of the top ranking query suggestion is provided for display among the two or more query suggestions.

Figure 5:
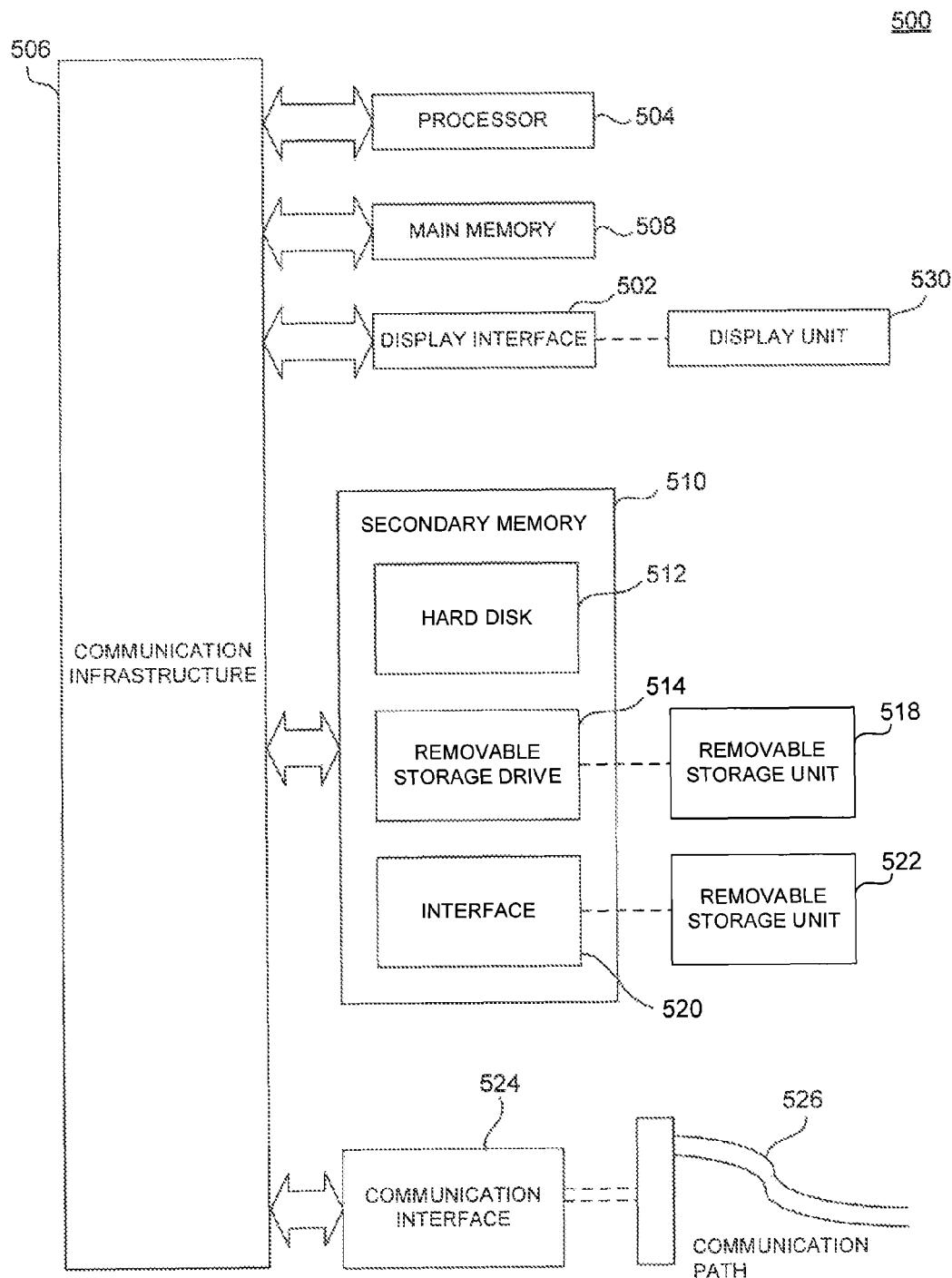
FIG. 5 is a system diagram that can be used to implement embodiments described herein.

FIG. 5 illustrates an example computer system 500 in which embodiments of the present invention, or portions thereof, may by implemented as computer-readable code. For example, retrieval system 200 may be implemented in computer system 500 using hardware, software, firmware, tangible computer readable media having instructions stored thereon, or a combination thereof and may be implemented in one or more computer systems or other processing systems. Hardware, software, or any combination of such may embody any of the modules, procedures and components in FIGS. 1-4.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments of the invention are described in terms of this example computer system 500. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general-purpose processor device. As will be appreciated by persons skilled in the relevant art, processor device 504 may also be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme.

Computer system 500 also includes a main memory 508, for example, random access memory (RAM), and may also include a secondary memory 510. Secondary memory 510 may include, for example, a hard disk drive 512, removable storage drive 514. Removable storage drive 514 may comprise a floppy disk drive, a magnetic tape drive, an optical disk drive, a flash memory, or the like. The removable storage drive 514 reads from and/or writes to a removable storage unit 518 in a well-known manner. Removable storage unit 518 may comprise a floppy disk, magnetic tape, optical disk, etc. which is read by and written to by removable storage drive 514. As will be appreciated by persons skilled in the relevant art, removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Computer program medium and computer usable medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via communications interface 524. Such computer programs, when executed, enable computer system 500 to implement the present invention as discussed herein. In particular, the computer programs, when executed, enable processor device 504 to implement the processes of the present invention, such as the stages in the method illustrated by flowchart 300 of FIG. 3 discussed above. Accordingly, such computer programs represent controllers of the computer system 500. Where the invention is implemented using software, the software may be stored in a computer program product and loaded into computer system 500 using removable storage drive 514, interface 520, and hard disk drive 512, or communications interface 524.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method, comprising:
   receiving a partial query from a user;
   identifying two or more query suggestions based on the partial query;
   determining a probability that each respective complete query suggestion is a query that the user intended to input;
   ranking the two or more query suggestions based on the probability of each respective query suggestion;
   establishing a top ranking query suggestion of the two or more query suggestions based upon the ranking;
   determining that the top ranking query suggestion is associated with a probability that is above a threshold;
   providing for display the two or more query suggestions relative to the partial query; and
   providing for display an indication of the top ranking query suggestion associated with the probability that is above the threshold, among two or more query suggestions.

2. The method of claim 1, wherein the providing for display an indication comprises providing a visual representation of a highlighting of the top ranking query suggestion.

3. The method of claim 1, wherein the providing for display an indication comprises providing a visual representation of a bar graph, wherein each bar in the graph represents a respective query suggestion.

4. The method of claim 2, wherein providing for display an indication of the top ranking query suggestion comprises:
   providing for display the highlighted top ranking query suggestion above the other query suggestions.

5. A computer-implemented method, comprising:
   receiving a partial query from a user;
   identifying two or more query suggestions based on the partial query;
   determining a probability that each respective query suggestion is a query that the user intended to input;
   ranking the two or more query suggestions based on the probability of each respective query suggestion;
   determining that neither of the two or more query suggestions is associated with a probability above a threshold;
   providing for display the two or more query suggestions relative to the partial query;
   receiving a change to the partial query;
   updating the two or more query suggestions and the ranking based on the determination that the partial query has changed;
   determining a top ranking query suggestion of the two or more query suggestions, wherein the top ranking query suggestion is associated with a probability above the threshold; and
   providing for display an indication of the top ranking query suggestion among the two or more query suggestions.

6. The method of claim 5, wherein providing an indication of the top ranking query suggestion among the two or more query suggestions comprises:
   providing a visual indication for display.

7. The method of claim 5, wherein providing an indication of the top ranking query suggestion among the two or more query suggestions comprises:
   providing an audible indication when the determination that the probability of the top ranking query suggestion exceeds the threshold.

8. A system comprising:
   one or more computers; and
   a computer-readable medium coupled to the one or more computers having instructions stored thereon which, when executed by the one or more computers, cause the one or more computers to perform operations comprising:
   receiving a partial query from a user;
   identifying two or more query suggestions based on the partial query;
   determining a probability that each respective complete query suggestion is a query that the user intended to input;
   ranking the two or more query suggestions based on the probability of each respective query suggestion;
   establishing a top ranking query suggestion of the two or more query suggestions based upon the ranking;
   determining that the top ranking query suggestion is associated with a probability above a threshold;
   providing for display the two or more query suggestions relative to the partial query; and
   providing for display an indication of the proportional ranking of the query suggestions among the two or more query suggestions.

9. The system of claim 8, wherein the indication is a highlighting of the top ranking query suggestion.

10. The system of claim 8, wherein the indication is a bar graph, and wherein each bar in the graph represents a respective query suggestion.

11. The system of claim 10, wherein each bar in graph is overlaid with a corresponding query suggestion.

12. The system of claim 8, wherein the providing for display an indication, comprises providing for display an indication that one or more of the query suggestions is associated with a probability that exceeds the threshold.

13. The system of claim 9, wherein providing for display, an indication of the top ranking query suggestion among the two or more query suggestions comprises:
   providing for display, the highlighted top ranking query suggestion above the other query suggestions.

* * * * *

UNITED STATES PATENT AND TRADEMARK OFFICE
CERTIFICATE OF CORRECTION

| | | |
|---|---|---|
| PATENT NO. | : 8,412,728 B1 | Page 1 of 1 |
| APPLICATION NO. | : 13/245768 | |
| DATED | : April 2, 2013 | |
| INVENTOR(S) | : James Roskind | |

It is certified that error appears in the above-identified patent and that said Letters Patent is hereby corrected as shown below:

Title Page
Item (57), Abstract section, please replace "providing for display, an indication" with --providing for display an indication--.

In the Claims:
Column 12
Line 50, Claim 11, please replace "in graph" with --in the graph--.

Signed and Sealed this
Twenty-ninth Day of October, 2013

Teresa Stanek Rea
*Deputy Director of the United States Patent and Trademark Office*